(12) United States Patent
Wells

(10) Patent No.: US 12,140,402 B2
(45) Date of Patent: Nov. 12, 2024

(54) SHROUD FOR A REFLEX SIGHT

(71) Applicant: Benjamin Wells, Fayetteville, TN (US)

(72) Inventor: Benjamin Wells, Fayetteville, TN (US)

(73) Assignee: HRF Concepts LLC, Fayetteville, TN (US)

( * ) Notice: Subject to any disclaimer, the term of this patent is extended or adjusted under 35 U.S.C. 154(b) by 0 days.

(21) Appl. No.: 18/134,159

(22) Filed: Apr. 13, 2023

(65) Prior Publication Data

US 2023/0332865 A1  Oct. 19, 2023

Related U.S. Application Data

(60) Provisional application No. 63/330,536, filed on Apr. 13, 2022.

(51) Int. Cl.
*F41G 1/30* (2006.01)
*F41G 1/06* (2006.01)
*G02B 23/16* (2006.01)

(52) U.S. Cl.
CPC .............. *F41G 1/30* (2013.01); *F41G 1/065* (2013.01); *G02B 23/16* (2013.01)

(58) Field of Classification Search
CPC .................................. F41G 1/065; F41G 1/30
See application file for complete search history.

(56) References Cited

U.S. PATENT DOCUMENTS

| 8,082,688 | B2 | 12/2011 | Elpedes et al. | |
| 9,696,114 | B1 * | 7/2017 | Cabrera | F41G 1/10 |
| 9,958,234 | B2 | 5/2018 | Campean | |
| 10,139,197 | B1 * | 11/2018 | Horton | F41G 1/383 |
| 11,774,217 | B2 * | 10/2023 | York | F41G 1/02 42/111 |
| 2010/0083554 | A1 * | 4/2010 | Elpedes | F41G 1/30 42/130 |
| 2013/0212922 | A1 * | 8/2013 | Thomas | F41G 1/065 42/143 |
| 2014/0237884 | A1 * | 8/2014 | Koesler | F41G 1/345 42/111 |
| 2015/0198415 | A1 * | 7/2015 | Campean | F41G 1/30 42/137 |
| 2016/0377377 | A1 * | 12/2016 | Collin | F41G 1/30 42/113 |
| 2016/0377378 | A1 * | 12/2016 | Collin | G02B 23/10 42/113 |
| 2020/0232759 | A1 * | 7/2020 | York | F41G 1/30 |
| 2020/0240748 | A1 * | 7/2020 | Connolly | F41G 1/387 |
| 2021/0116213 | A1 | 4/2021 | York et al. | |
| 2021/0325146 | A1 * | 10/2021 | Thomele | F41G 1/065 |

(Continued)

FOREIGN PATENT DOCUMENTS

CN  117537662 A  *  2/2024

*Primary Examiner* — Gabriel J. Klein
(74) *Attorney, Agent, or Firm* — Asgaard Patent Services, LLC; F. Wayne Thompson, Jr.

(57) ABSTRACT

Disclosed is a shroud configured to convert an open emitter reflex sight into an enclosed emitter reflex sight. More specifically, the shroud includes a transparent window and is configured to be attached to the main body of the housing and thereby form an enclosure for the emitter of the reflex sight. In some implementations, the shroud is used in conjunction with a drainage plug assembly configured to seal drain openings in the main body of the open emitter reflex sight.

8 Claims, 16 Drawing Sheets

(56) References Cited

U.S. PATENT DOCUMENTS

| | | | | |
|---|---|---|---|---|
| 2021/0396490 | A1* | 12/2021 | Pischke | F41G 1/30 |
| 2022/0026175 | A1* | 1/2022 | Chavez | F41G 1/30 |
| 2022/0140629 | A1* | 5/2022 | Yang | F41G 11/003 |
| | | | | 42/131 |
| 2022/0390207 | A1* | 12/2022 | Chavez | F41G 1/01 |
| 2023/0185074 | A1* | 6/2023 | Crispin | F41G 1/38 |
| | | | | 359/428 |
| 2024/0027165 | A1* | 1/2024 | York | H01M 50/247 |

* cited by examiner

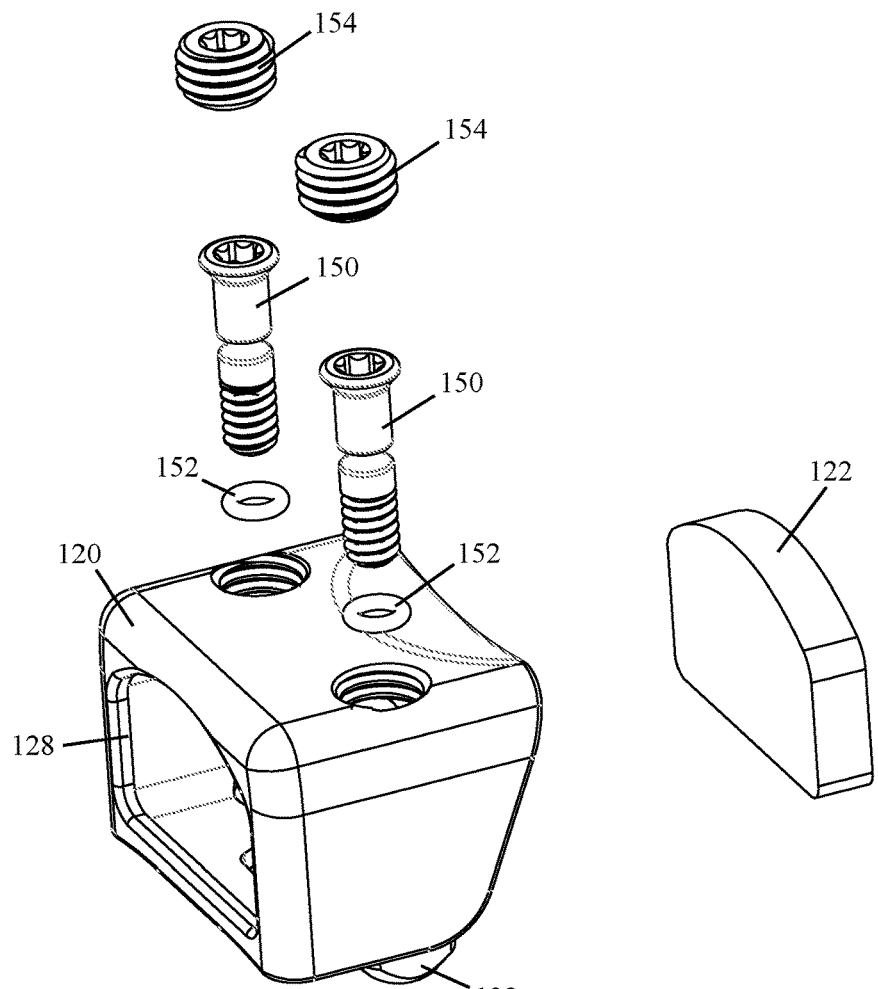
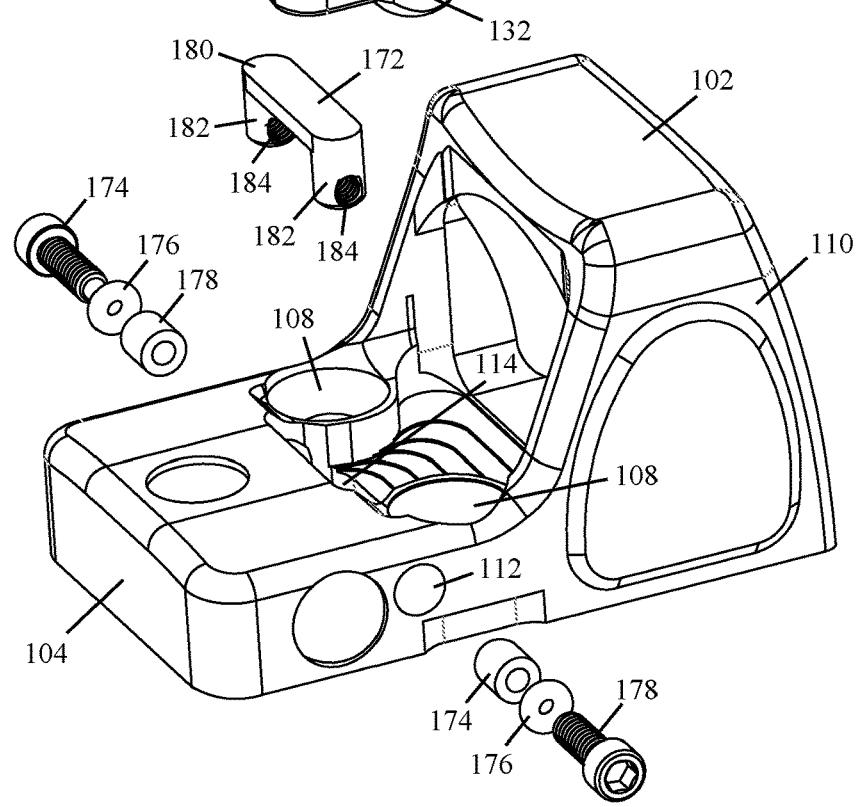
FIG. 11

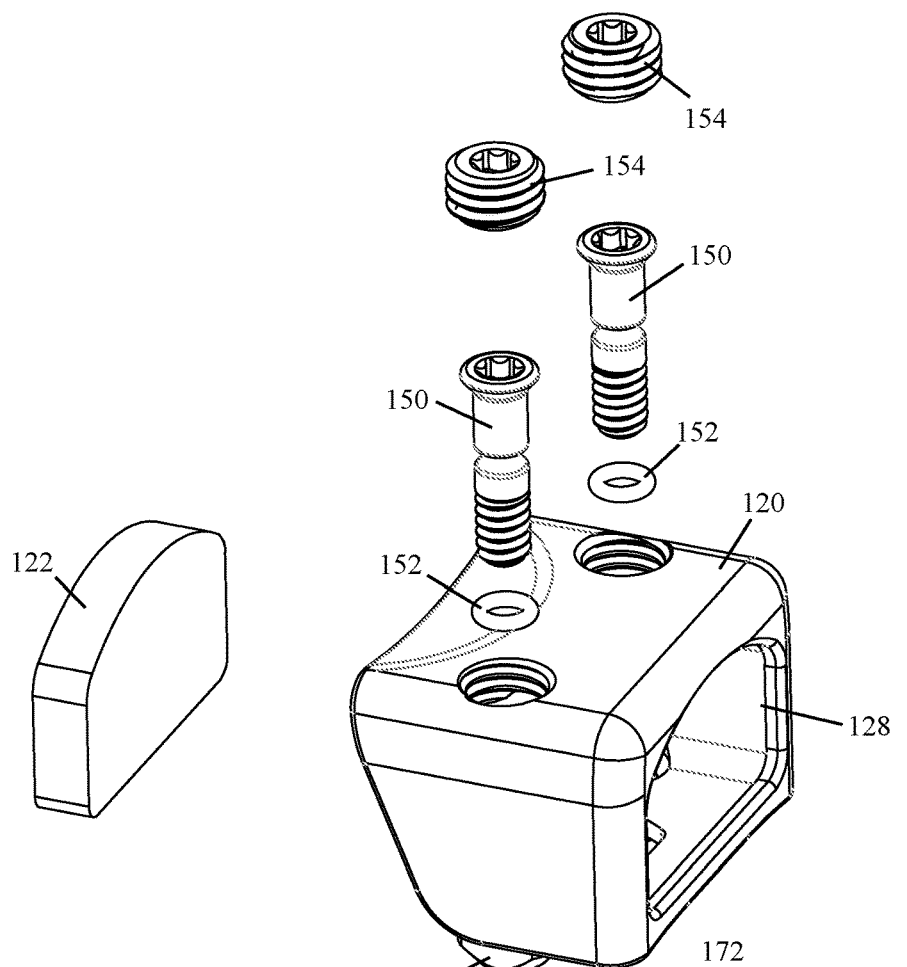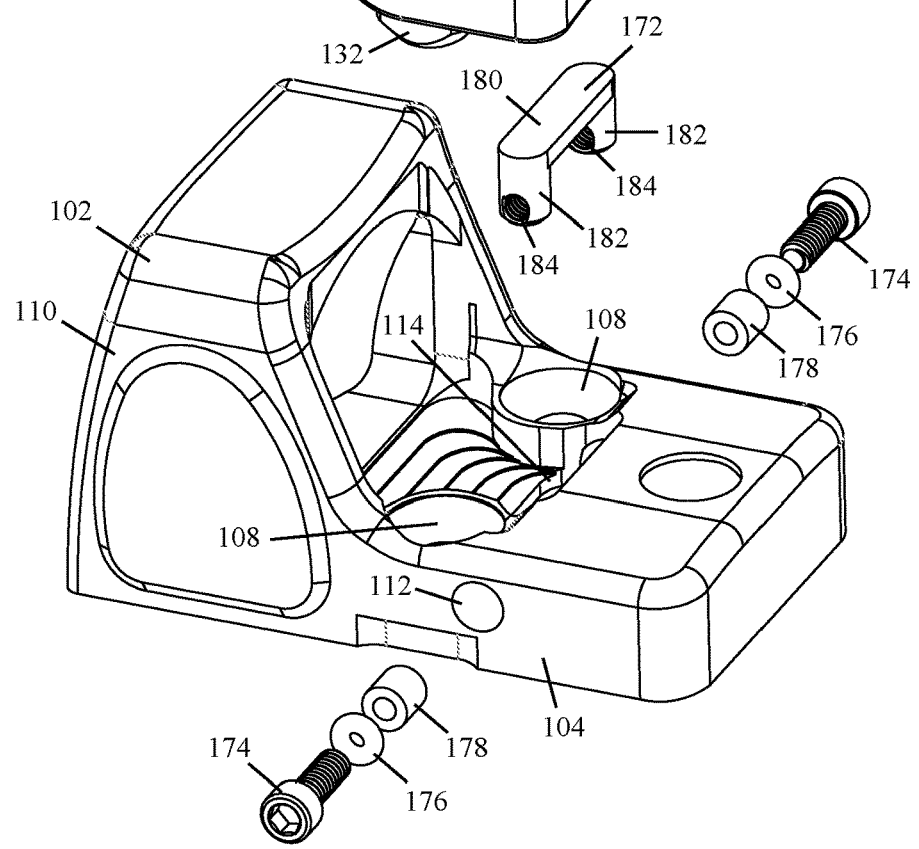
FIG. 12

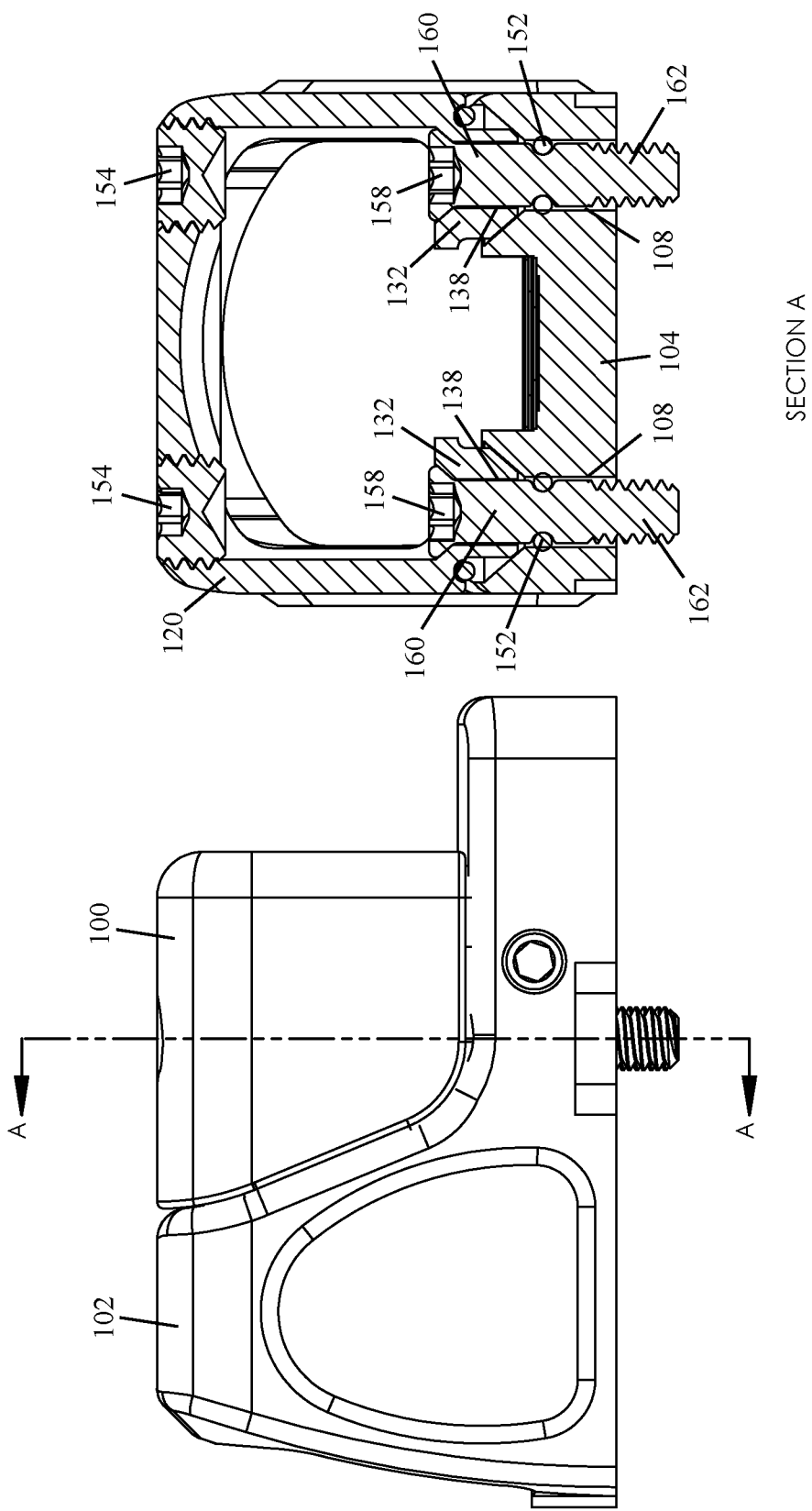

SHROUD FOR A REFLEX SIGHT

CROSS-REFERENCE TO RELATED APPLICATION(S)

This application claims the benefit of U.S. Provisional Application Ser. No. 63/330,536, filed on Apr. 13, 2022, the entirety of which is incorporated herein by reference.

TECHNICAL FIELD

This disclosure relates to implementations of a shroud for a reflex sight. In particular, the present disclosure is directed to a removable shroud configured to convert an open emitter reflex sight into an enclosed emitter reflex sight.

BACKGROUND

An open emitter reflex sight, such as the Trijicon RMR®, includes an optical element which receives light from an emitter (e.g., a light emitting diode) and displays a reticle on a lens for use by a user in aligning a barrel of a firearm with a target. However, this design is subject to being disabled by weather, such as rain or snow, or other environmental debris blocking the emitter.

An enclosed emitter reflex sight, such as the Aimpoint ACRO® P-2, typically includes a housing and an additional optical element (i.e., a rear lens or window). Together, the two optical elements and the housing form an enclosure for the emitter of the reflex sight. This arrangement of parts ensures that nothing comes between the emitter and the optical element displaying the reticle.

Accordingly, needs exist for the shroud for a reflex sight disclosed herein. It is to the provision of a shroud for a reflex sight configured to address these needs, and others, that the present invention is primarily directed.

SUMMARY OF THE INVENTION

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a shroud configured to convert an open emitter reflex sight into an enclosed emitter reflex sight. More specifically, the shroud includes a transparent window and is configured to be attached to the main body of the housing and thereby form an enclosure for the emitter of the reflex sight. In some implementations, the shroud is used in conjunction with a drainage plug assembly configured to seal drain openings in the main body of the open emitter reflex sight.

An example shroud comprises: a body that includes a base, a pair of posts, an opening, and a cross member extending over the opening and between the posts; and a window disposed within the opening of the body. A pair of bosses configured to locate the shroud on the housing of the open emitter reflex sight extend from an underside of the base. Each boss is configured to fit within a tapered inlet of an attachment aperture in the housing of the open emitter reflex sight. A pair of openings extend through the cross member of the body. Each opening is axially aligned with a bore extending through an underlying boss on the base of the body.

Yet another example shroud comprises: a body that includes a base, a pair of posts, an opening, and a cross member extending over the opening and between the posts; a window disposed within the opening of the body; and a drainage plug assembly configured to seal two drain openings in the housing of the open emitter reflex sight. The drainage plug assembly comprises a bridge member configured to fit within a recess in the housing of the open emitter reflex sight. The bridge member extends between the two drain openings and comprises an elongate body and two arms. Each of the two arms extends from an end of the elongate body and includes an opening. The drainage plug assembly further comprises two fasteners. Each fastener has a sealing assembly disposed on a shank of the fastener.

BRIEF DESCRIPTION OF THE DRAWINGS

FIGS. 11 and 12 are additional perspective views of the shroud and open emitter reflex sight depicted in FIGS. 1-3, wherein the shroud is shown exploded from the open emitter reflex sight.

FIG. 13A is another side elevational view of the shroud and open emitter reflex sight shown in FIGS. 1-3.

FIG. 13B is a cross-sectional view of the shroud and open emitter reflex sight taken along lines A-A shown in FIG. 13A.

Like reference numerals refer to corresponding parts throughout the several views of the drawings.

DETAILED DESCRIPTION

Figure 1:
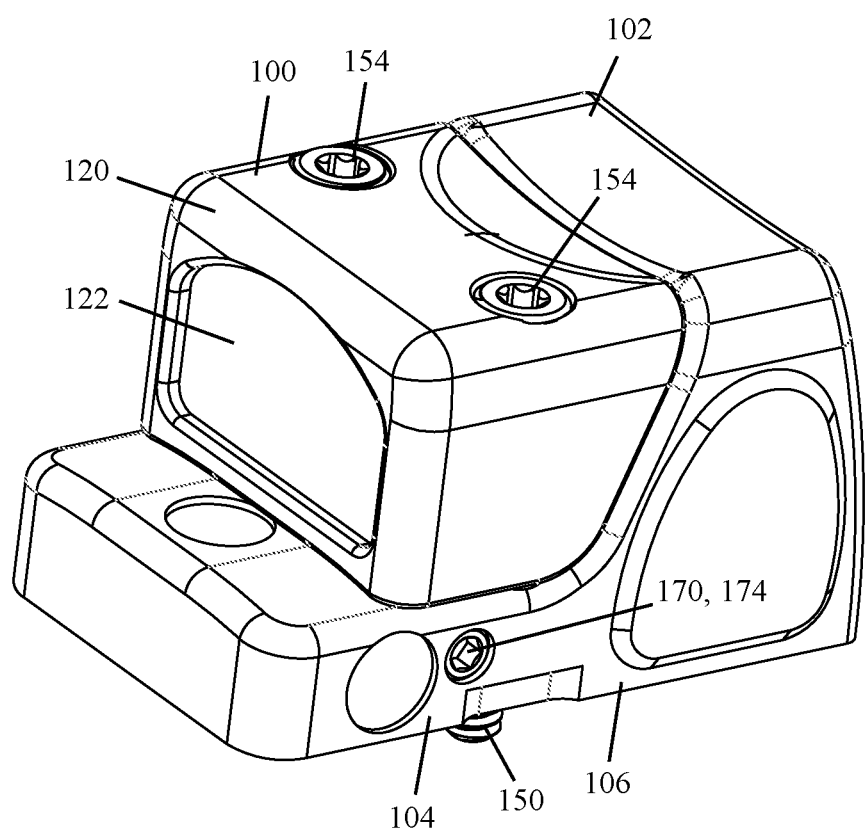
FIGS. 1-3 are perspective views of a shroud according to the principles of the present disclosure positioned on a compatible open emitter reflex sight.
Figure 2:
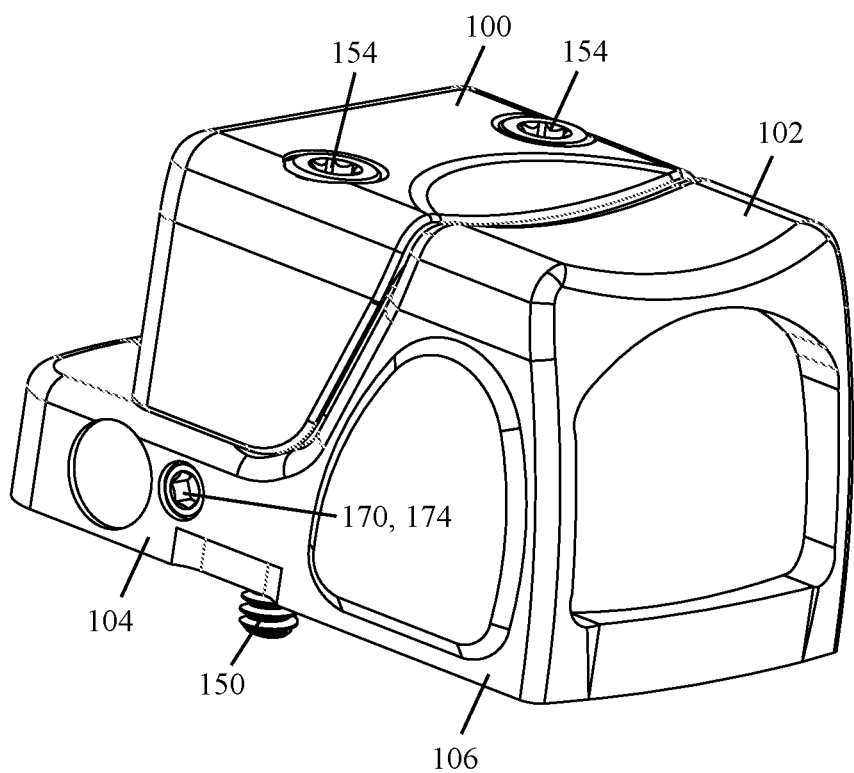
Figure 3:
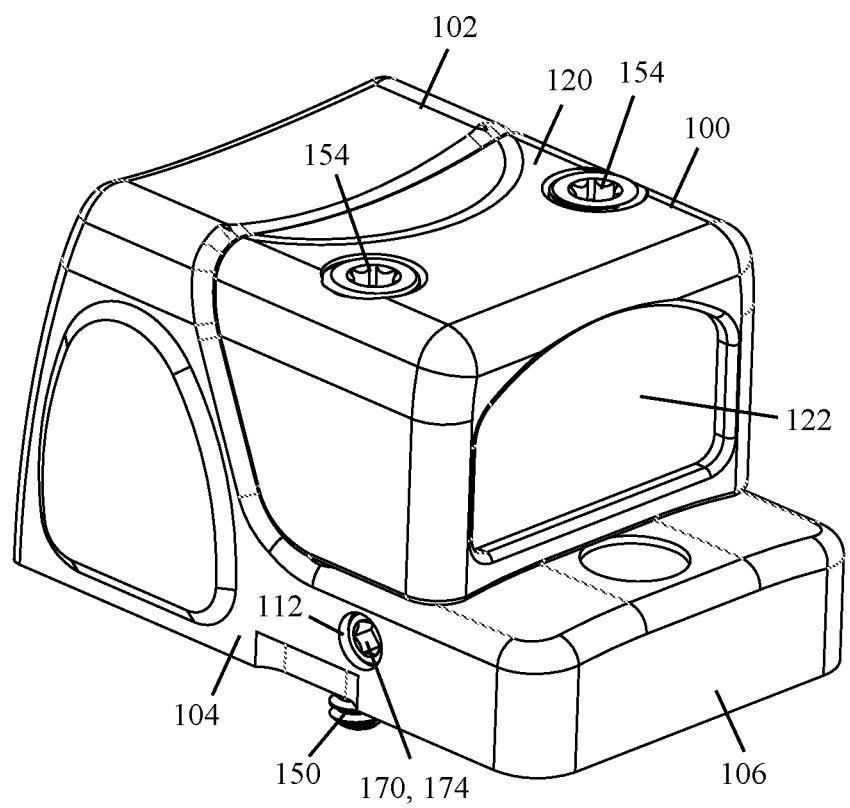
Figure 4:
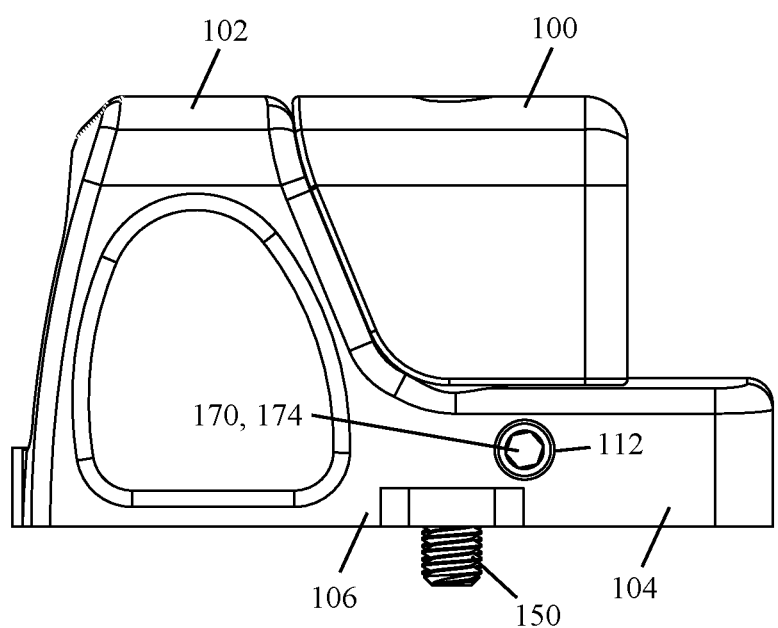
FIG. 4 is a side elevational view of the shroud and open emitter reflex sight shown in FIGS. 1-3.

FIGS. 1-4 illustrate an example shroud 100 according to the principles of the present disclosure. The shroud 100 includes a transparent window and is configured to convert an open emitter reflex sight 102 into an enclosed emitter reflex sight. More specifically, the shroud 100 is configured to be attached to the main body 104 of the housing 106 and thereby form an enclosure for the emitter of the reflex sight 102. In some implementations, the shroud 100 is used in conjunction with a drainage plug assembly 170 configured to seal drain openings 112 in the main body 104 of the open emitter reflex sight 102.

Figure 5:
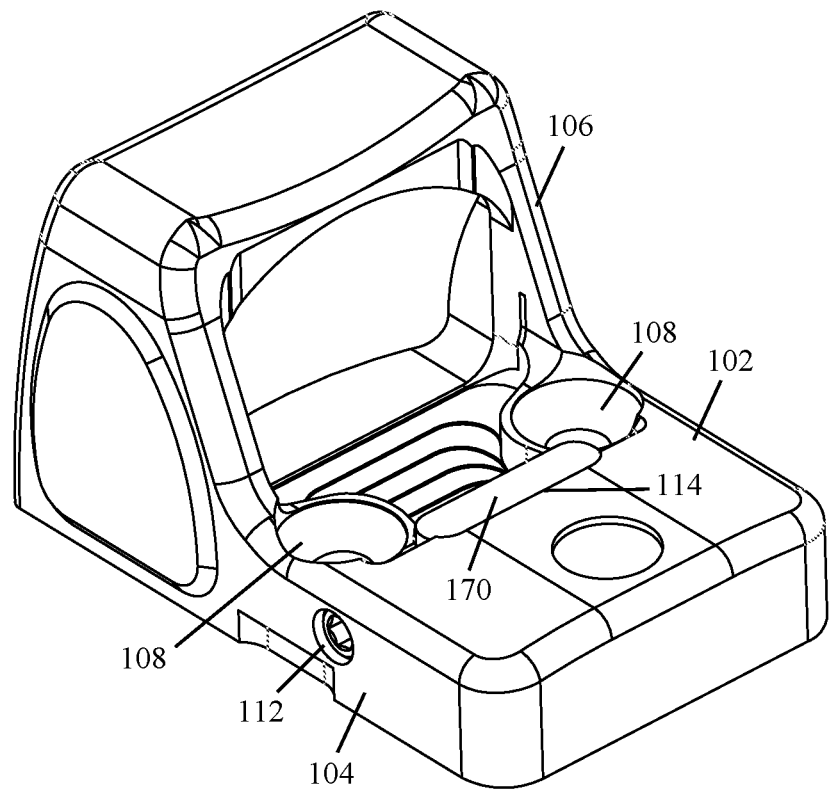
FIGS. 5 and 6 are perspective views of the open emitter reflex sight shown in FIGS. 1-3.
Figure 6:
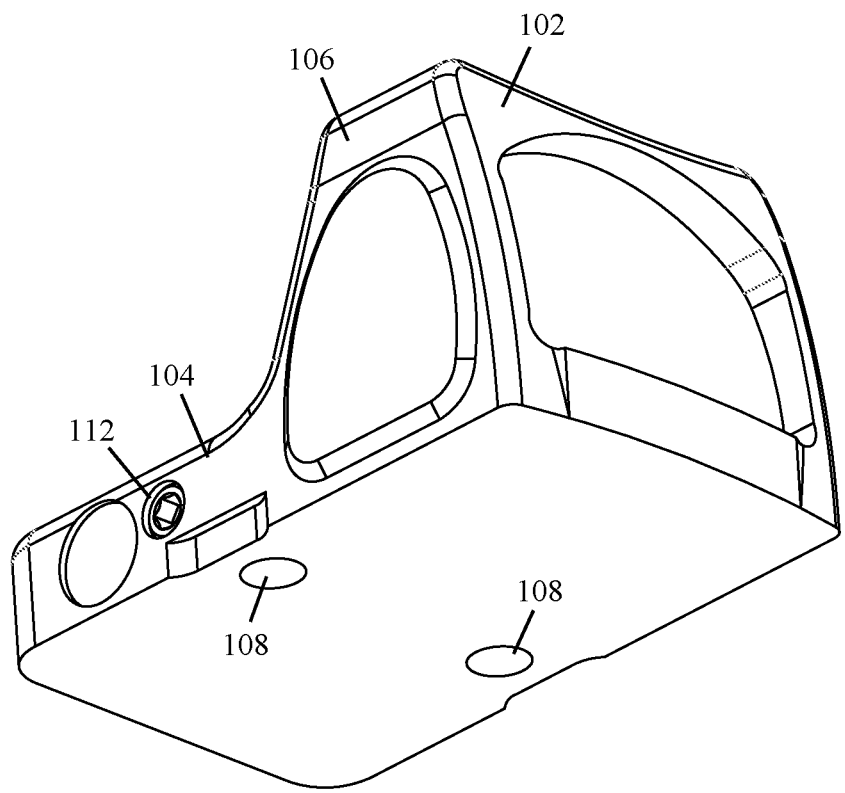
Figure 7:
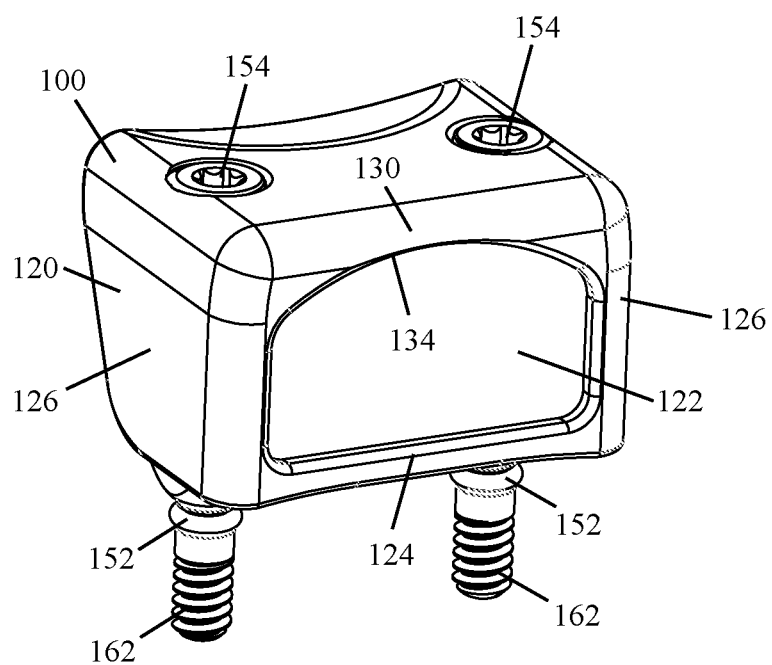
FIGS. 7 and 8 are perspective views of the shroud shown in FIGS. 1-3.
Figure 8:
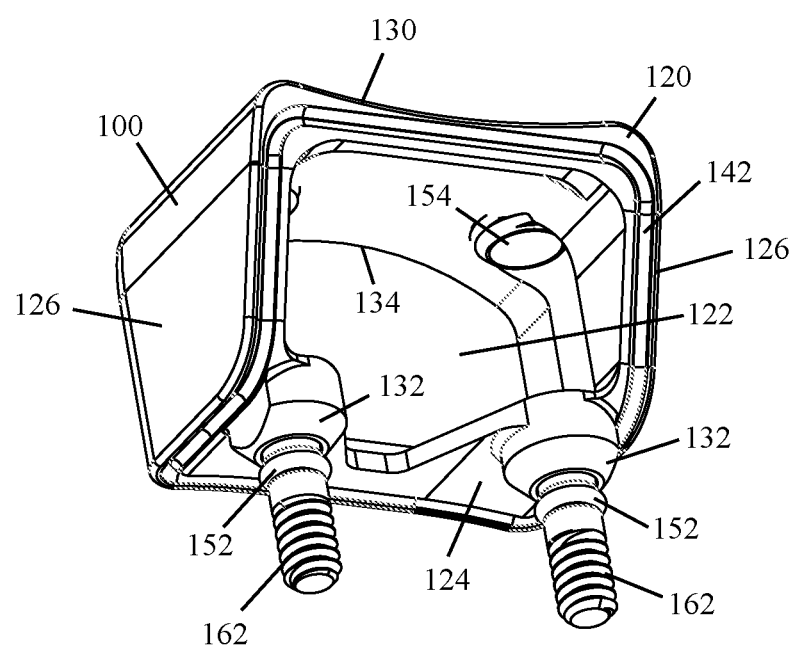

FIGS. 5 and 6 illustrate the open emitter reflex sight 102 without the shroud 100 installed. The open emitter reflex sight 102 is a Trijicon RMR® that is described in U.S. Pat. No. 8,082,688, which is in incorporated herein by reference in its entirety. However, it should be understood that the shroud 100 could be configured for use with other open emitter reflex sights.

FIGS. 7-10 illustrate the shroud 100, and fasteners (150, 154) and O-rings (152) used to install the shroud 100 on the open emitter reflex sight 102 shown in FIGS. 5 and 6. The shroud 100 can be installed and removed by the user, using simple hand tools.

As shown in FIGS. 7-10, the shroud 100 comprises a body 120 and a window 122. The body 120 of the shroud 100 includes a base 124, a pair of posts 126, an opening 128, and a cross member 130 extending over the opening 130 and between the posts 126. The opening 128 may have a generally D-shape to accommodate the window 122. The cross member 130 provides the opening 128 with the D-shape and includes a bottom surface 134 having a convex shape. The window 122 is a transparent lens (i.e., an optical element) supported by and attached to the body 120 of the shroud 100. The window 122 may be attached to the body 120 using an epoxy or other suitable adhesive. A pair of bosses 132 extend from the underside of the base 124. The bosses 132 are used to locate the shroud 100 on the housing 106 of the reflex sight. Each boss 132 is adapted (i.e., positioned and shaped) to fit within the tapered inlet of an attachment aperture 108 in the main body 104 of the reflex sight 102. A pair of threaded openings 136 extend through the cross member 130 of the body 120. Each of the threaded openings 136 is axially aligned with, and larger in diameter than, a bore 138 extending through the underlying boss 132 on the base 124 of the body 120 (see, e.g., FIG. 13). The threaded openings 136 selectively receive a pair of grub screws 154 that seal the threaded openings 136. The bores 132 selectively receive a pair of fasteners 150 used to removably attach the shroud 100 and the reflex sight 120 to a firearm.

Figure 9:
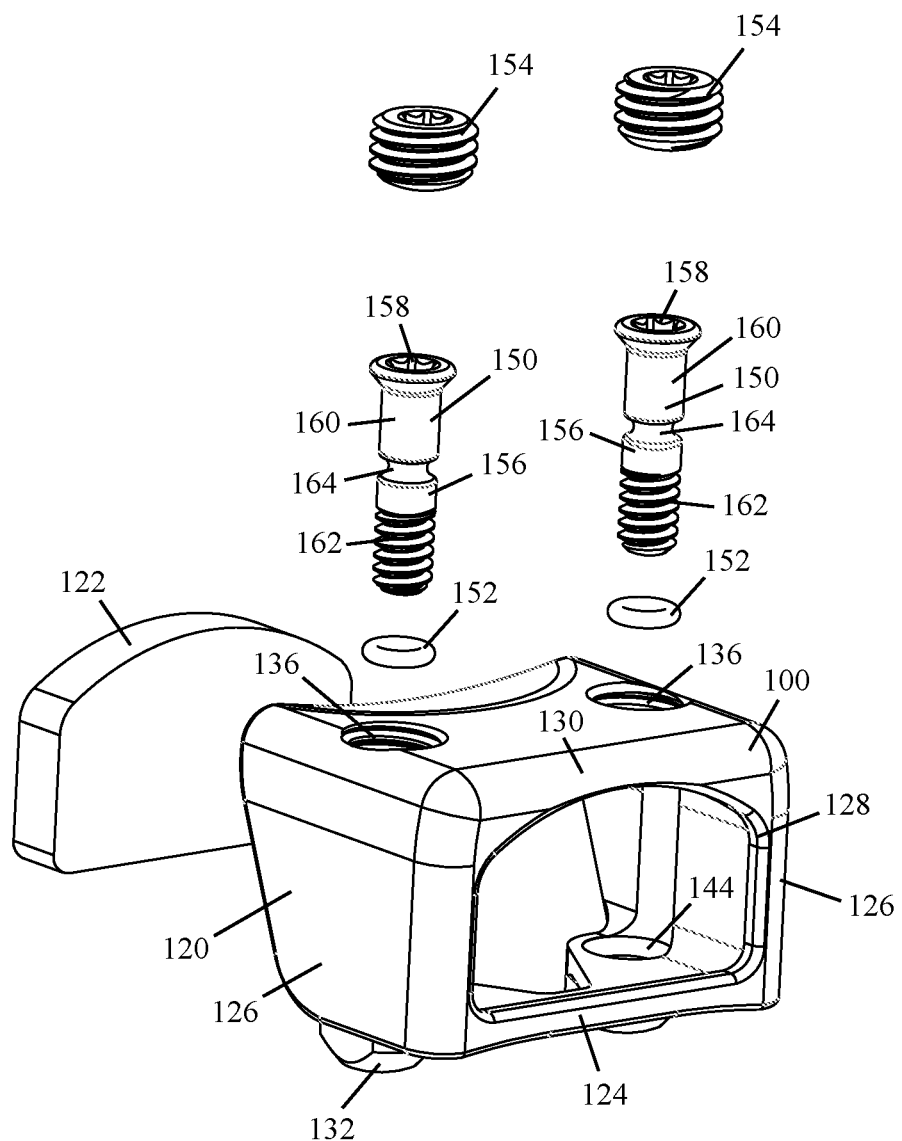
FIGS. 9 and 10 are exploded perspective views of the shroud shown in FIGS. 7 and 8.
Figure 10:
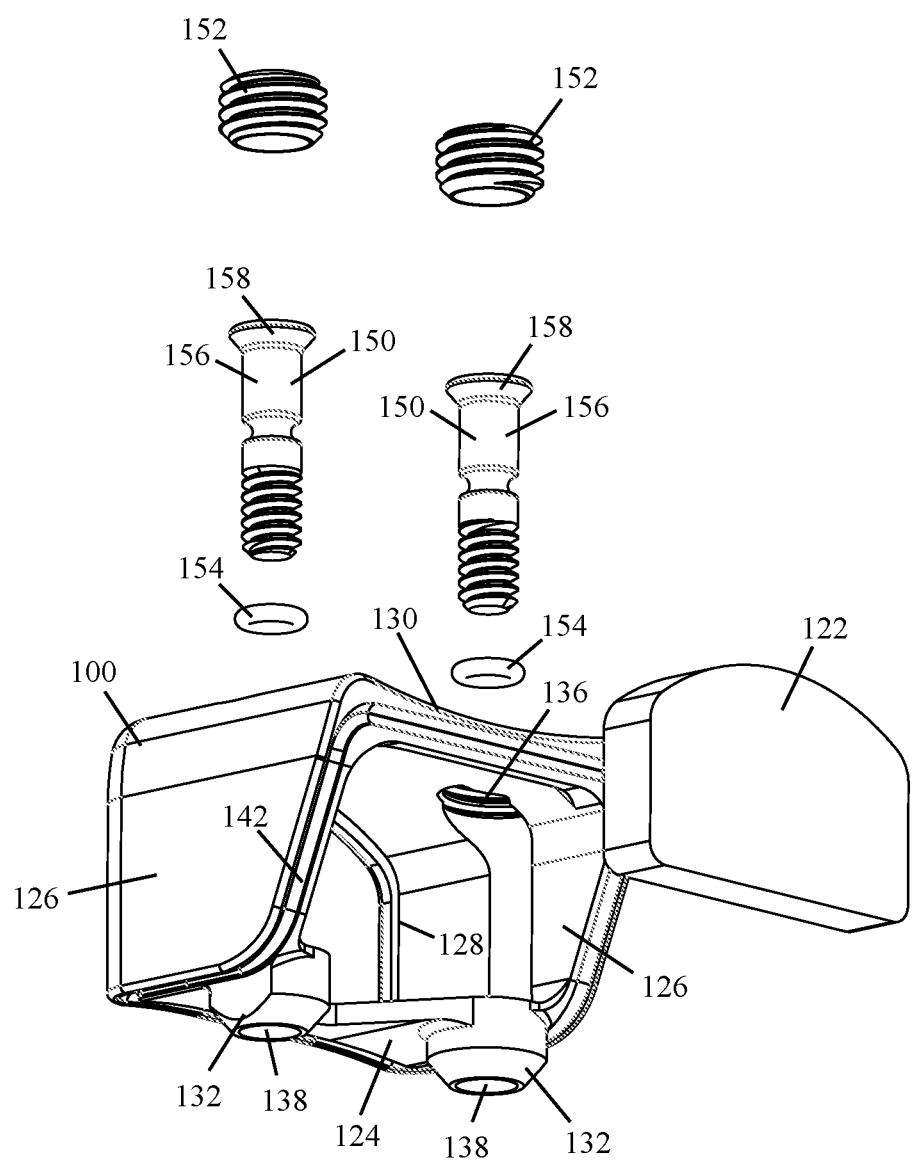

As shown in FIGS. 9 and 10, the fasteners 150 comprise a shank 156 and a countersunk head 158. The shank 156 comprises an unthreaded portion 160 and a threaded portion 162. As shown in FIG. 13B, the unthreaded portion 160 is positioned within the bore 138 in one of the bosses 132 on the shroud 100 and the corresponding attachment aperture 108 in the reflex sight 102; the threaded portion 162 extends from the underside of the reflex sight 102 and is used to attach the shroud 100 and reflex sight 102 assembly to a firearm. A gasket 152 is positioned within each attachment aperture 108 of the reflex sight 102 to prevent debris and/or fluid from passing therethrough. In the example embodiment, the gasket 152 is an O-ring positioned within a circumferential groove 164 in the shank 156 of the fastener 150 (see, e.g., FIG. 13B). The countersunk head 158 is configured to interface with the countersunk inlet 144 of the bore 138 extending through each of the bosses 132.

Figure 15:
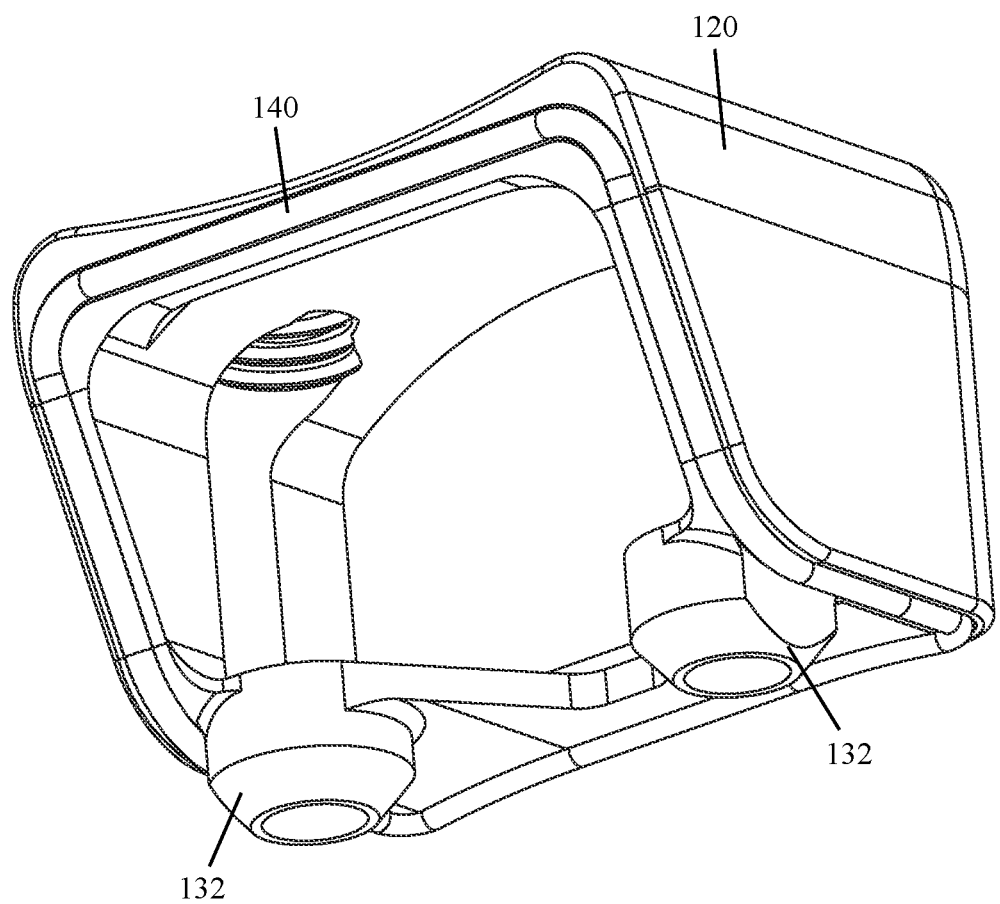
FIG. 15 is a perspective view of the shroud body depicted in FIGS. 7 and 8, wherein a gasket is shown positioned within the recess in the perimeter edge of the shroud body.
Figure 16:
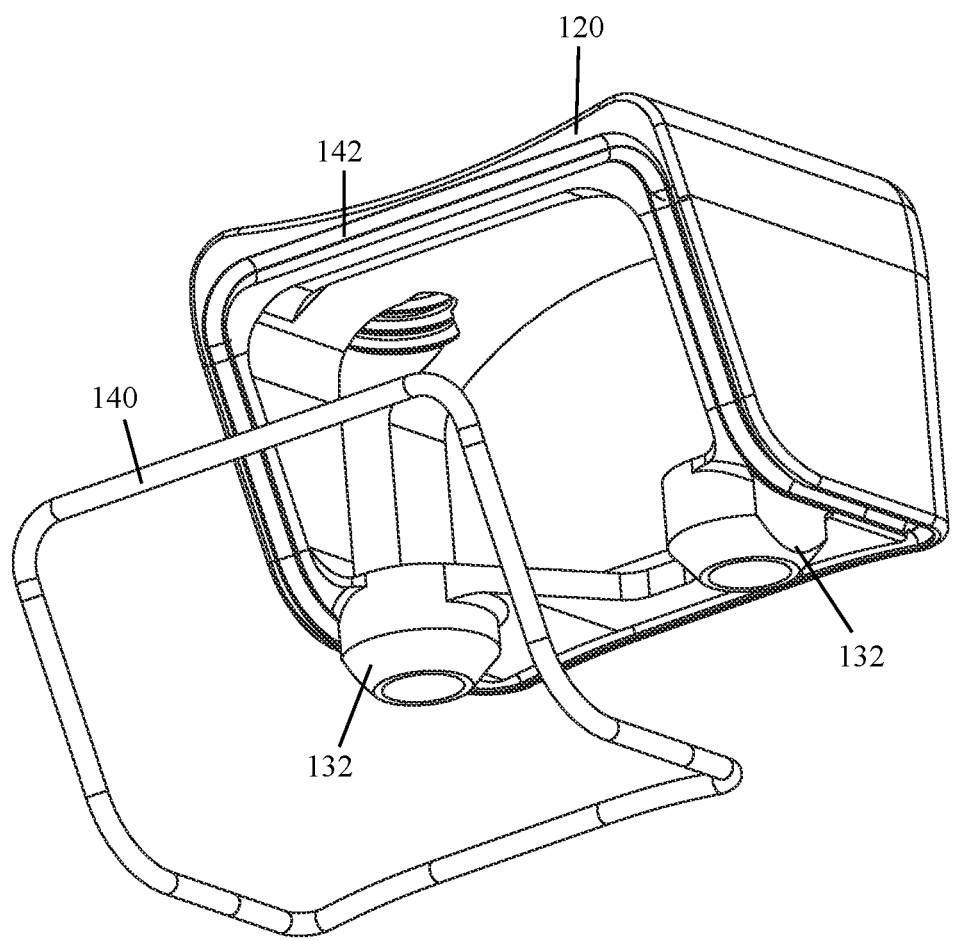
FIG. 16 is another perspective view of the shroud body depicted in FIG. 15, wherein the gasket is shown exploded from the recess in the perimeter edge of the shroud body.

The shroud 100 prevents intrusion of debris and/or fluid into the enclosure formed by securing the shroud 100 to the open emitter reflex sight 102. The emitter of the reflex sight 102 may be further protected from intrusion of such debris and/or fluid by providing a gasket 140 (see, e.g., FIG. 15) and/or a drainage plug assembly 170.

The gasket 140 is positioned within a recess 142, which may extend about the perimeter edge of the shroud body 120 in contact with the reflex sight housing 106. The gasket 140 may engage the main body 104 and the upwardly extending portion 110 of the reflex sight housing 106. In this way, debris and/or fluid is prevented from passing through the junction between the shroud 100 and the housing 106 of the reflex sight 102. The gasket 140 may be an O-ring made of nitrile rubber.

Figures 14A, 14B:
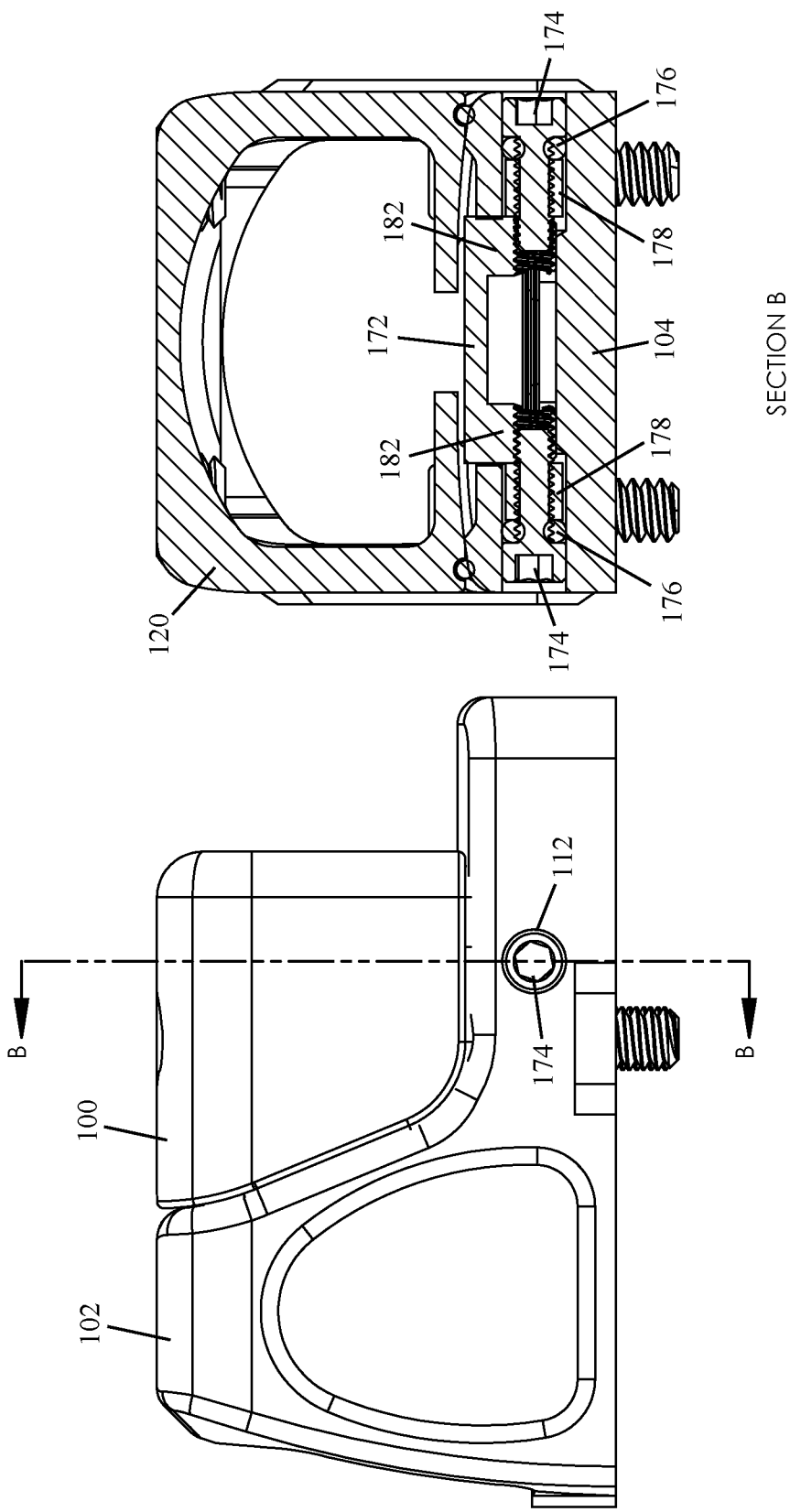
FIG. 14A is yet another side elevational view of the shroud and open emitter reflex sight shown in FIGS. 1-3.
FIG. 14B is a cross-sectional view of the shroud and open emitter reflex sight taken along lines B-B shown in FIG. 14A.

As shown in FIGS. 1-5, the drainage plug assembly 170 is configured to seal the two drain openings 112 in the main body 104 of the reflex sight 102. As shown best in FIGS. 11 and 12, the drain plug assembly 170 comprises a bridge member 172, and a screw 174, O-ring 176, and a spacer 178 for each drain opening 112. The bridge member 172 is configured to fit within a recess 114 in the main body 104 of the reflex sight 102 and extend between each drain opening 112 (see, e.g., FIG. 14B). The bridge member 172 comprises an elongate body 180 and two arms 182. Each of the two arms 182 extends from an end of the elongate body 180, at a perpendicular angle relative to the elongate body 180. Each arm 182 includes a threaded opening 184 proximate to a distal end thereof. As shown best in FIG. 14B, each threaded fastener 174 has an O-ring 176 and a hollow cylindrical spacer 178 disposed on its threaded shank, the hollow cylindrical spacer 178 abuts a lateral side of one arm 182. The threaded fastener 174 is configured to selectively engage with the threaded opening 184 in the distal end of the arm 182. Tightening the threaded fastener 184 presses the O-ring 176 against the spacer 178, thereby causing the O-ring 176 to expand. In this way, the drain opening 112 is sealed against debris and/or fluid.

The base 124, the pair of posts 126, and the cross member 130 of the shroud 100 may be integrally formed. The base 124, the pair of posts 126, and the cross member 130 of the example shroud 100 are a single-piece polymer construction. However, the base 124, the pair of posts 126, and the cross member 130 of the shroud 100 could be a single-piece metal construction (e.g., an aluminum alloy).

The window 122 is made of tempered glass.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A shroud configured to convert an open emitter reflex sight into an enclosed emitter reflex sight, the shroud comprising:

a body that includes a base, a pair of posts, an opening, and a cross member extending over the opening and between the posts; and a window disposed within the opening of the body; wherein:

a pair of bosses configured to locate the shroud on a housing of the open emitter reflex sight extend from an underside of the base, each boss is configured to fit within a tapered inlet of an attachment aperture in the housing of the open emitter reflex sight; and a pair of openings extend through the cross member of the body, each opening is axially aligned with a bore extending through an underlying boss on the base of the body.

2. The shroud of claim 1, further comprising a gasket configured to prevent water from passing under a perimeter edge of the shroud in contact with the housing of the open emitter reflex sight, the gasket is positioned within a recess in the perimeter edge of the body.

3. The shroud of claim 1, further comprising a drainage plug assembly configured to seal two drain openings in the housing of the open emitter reflex sight.

4. The shroud of claim 3, wherein the drainage plug assembly comprises a bridge member configured to fit within a recess in the housing of the open emitter reflex sight, the bridge member extends between the two drain openings and comprises an elongate body and two arms, each of the two arms extends from an end of the elongate body and includes an opening, the drainage plug assembly further comprises two fasteners, each fastener has a sealing assembly disposed on a shank of the fastener.

5. A shroud configured to convert an open emitter reflex sight into an enclosed emitter reflex sight, the shroud comprising:

a body that includes a base, a pair of posts, an opening, and a cross member extending over the opening and between the posts;

a window disposed within the opening of the body; and a drainage plug assembly configured to seal two drain openings in a housing of the open emitter reflex sight;

wherein:

the drainage plug assembly comprises a bridge member configured to fit within a recess in the housing of the open emitter reflex sight, the bridge member extends between the two drain openings and comprises an elongate body and two arms, each of the two arms extends from an end of the elongate body and includes an opening, the drainage plug assembly further comprises two fasteners, each fastener has a sealing assembly disposed on a shank of the fastener.

6. The shroud of claim 5, wherein a pair of bosses configured to locate the shroud on the housing of the open emitter reflex sight extend from an underside of the base, each boss is configured to fit within a tapered inlet of an attachment aperture in the housing of the open emitter reflex sight.

7. The shroud of claim 5, further comprising a gasket configured to prevent water from passing under a perimeter edge of the shroud in contact with the housing of the open emitter reflex sight, the gasket is positioned within a recess in the perimeter edge of the body.

8. The shroud of claim 5, wherein each sealing assembly comprises an O-ring and a hollow cylindrical spacer disposed on the shank of the fastener.

\* \* \* \* \*